(12) United States Patent
Moakley

(10) Patent No.: US 7,596,790 B2
(45) Date of Patent: Sep. 29, 2009

(54) ALLOCATING COMPUTING RESOURCES IN A DISTRIBUTED ENVIRONMENT

(75) Inventor: George P. Moakley, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 10/652,528

(22) Filed: Aug. 29, 2003

(65) Prior Publication Data
US 2005/0050545 A1 Mar. 3, 2005

(51) Int. Cl.
G06F 9/46 (2006.01)
G06F 15/16 (2006.01)
G06F 15/173 (2006.01)
G06F 11/00 (2006.01)
G06F 9/44 (2006.01)

(52) U.S. Cl. .......................... 718/104; 718/1; 718/102; 709/201; 709/223; 709/226; 717/103; 714/10; 714/15; 714/41

(58) Field of Classification Search ......... 718/100–108, 718/1; 709/201–226; 707/10; 714/10, 15, 714/41; 717/103
See application file for complete search history.

(56) References Cited

U.S. PATENT DOCUMENTS

| | | | | |
|---|---|---|---|---|
| 4,648,031 A | * | 3/1987 | Jenner | 714/10 |
| 4,961,133 A | * | 10/1990 | Talati et al. | 717/148 |
| 5,095,421 A | * | 3/1992 | Freund | 718/101 |
| 5,659,701 A | * | 8/1997 | Amit et al. | 719/317 |
| 5,841,980 A | * | 11/1998 | Waters et al. | 709/204 |
| 6,052,525 A | * | 4/2000 | Carlson et al. | 717/100 |
| 6,067,545 A | * | 5/2000 | Wolff | 707/10 |
| 6,104,962 A | * | 8/2000 | Sastry | 700/86 |
| 6,230,312 B1 | * | 5/2001 | Hunt | 717/108 |
| 6,263,491 B1 | * | 7/2001 | Hunt | 717/130 |
| 6,269,378 B1 | * | 7/2001 | Quirt | 707/103 R |
| 6,591,290 B1 | * | 7/2003 | Clarisse et al. | 709/205 |
| 6,718,486 B1 | * | 4/2004 | Roselli et al. | 714/41 |
| 6,738,926 B2 | * | 5/2004 | Mathiske et al. | 714/15 |
| 6,934,755 B1 | * | 8/2005 | Saulpaugh et al. | 709/226 |
| 7,093,004 B2 | * | 8/2006 | Bernardin et al. | 709/219 |
| 7,103,625 B1 | * | 9/2006 | Hipp et al. | 709/201 |
| 7,174,381 B2 | * | 2/2007 | Gulko et al. | 709/226 |
| 7,249,357 B2 | * | 7/2007 | Landman et al. | 718/102 |
| 2002/0032754 A1 | * | 3/2002 | Logston et al. | 709/219 |
| 2003/0191795 A1 | * | 10/2003 | Bernardin et al. | 709/105 |
| 2004/0040025 A1 | * | 2/2004 | Lehtinen | 718/104 |

OTHER PUBLICATIONS

Webopedia Computer Dictionary, "What is Footprint", p. 1.*

* cited by examiner

Primary Examiner—Van H Nguyen
Assistant Examiner—Jennifer N To
(74) Attorney, Agent, or Firm—Trop, Pruner & Hu, P.C.

(57) ABSTRACT

In one embodiment of the present invention, a computing system includes a plurality of systems coupled in a distributed infrastructure, and a resource allocator to allocate activities of an application to at least two of the systems. The distributed infrastructure may be a tightly coupled infrastructure and may include a virtualized application environment that emulates a runtime environment of the application, in such an embodiment.

13 Claims, 4 Drawing Sheets

ALLOCATING COMPUTING RESOURCES IN A DISTRIBUTED ENVIRONMENT

BACKGROUND

The present invention relates to allocating computing resources and more particularly to allocating such resources in a distributed environment.

Enterprises are increasingly reliant on the availability of their information systems. Concurrently, they face decreasing budgets for implementing these information systems. A challenge exists in achieving high availability solutions using commoditized, low-cost equipment, without requiring application modifications or re-writes. Achieving this goal requires an ability to adapt existing applications, whether custom developed or commercially available, to a distributed environment, such as a grid or cluster environment, without modification.

Enterprises typically have two choices with regard to implementing applications on a distributed environment. First, the enterprise may achieve scalability and availability through specialized computational platforms (e.g., high capacity and/or high availability systems). High availability systems are very expensive, and high capacity systems are expensive, represent single sources of failure, and are designed with capacity limits that can only be surpassed by substitution with a different design.

Second, an enterprise may perform custom application development for its distributed infrastructure. If an application has not been specifically written to run on a distributed infrastructure, then the application must be run on a single computer, which inherently suffers from poor scalability and availability. Very few commercial applications are written to run on a distributed infrastructure; those few that are so written are provided in discrete functionality subsets that must be run on single computers, for which the same scalability/availability issues apply.

Thus for an enterprise having a distributed environment, if the enterprise desires an application to be operated across a set of computers (e.g., servers) in the environment, it must rewrite the application for such operation. Alternately, an application may be executed on a single server which is not accessible to the other computers in the environment.

A need thus exists to permit applications written for a single platform to be run without modification in a distributed environment, thus achieving scalability and high availability.

DETAILED DESCRIPTION

Figure 1:
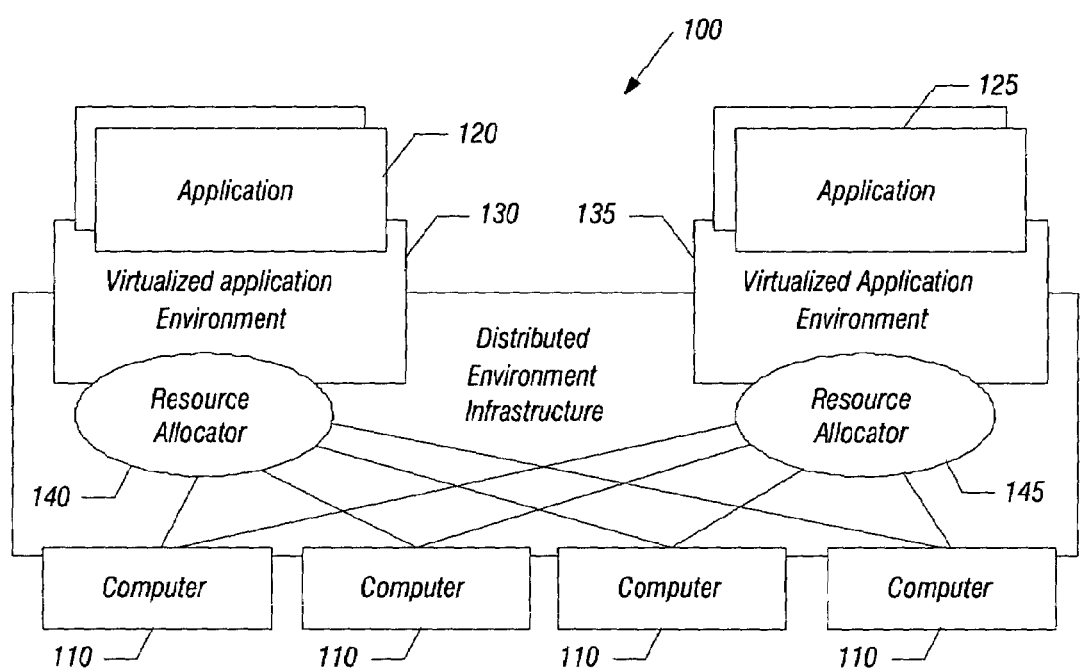
FIG. 1 is a block diagram of a distributed infrastructure in accordance with one embodiment of the present invention.

Referring to FIG. 1, shown is a block diagram of a distributed infrastructure in accordance with one embodiment of the present invention. As shown in FIG. 1, distributed environment infrastructure 100 includes a plurality of computers 110. While such computers 110 may vary in different embodiments, in one embodiment, each computer 110 may be a server computer, such as an enterprise server, a rack server, a modular server, a blade server or another low-cost server. In certain embodiments, computers 110 may be a heterogeneous set, including different hardware types and/or different operating systems.

Also shown in FIG. 1 is a pair of application programs ("applications") 120 and 125 to be executed on the plurality of computers. The applications 120 and 125 may vary in different embodiments, but in certain embodiments may be custom developed or commercial off the shelf (COTS) applications that an enterprise may desire to execute in a distributed environment infrastructure. While shown in FIG. 1 as including two applications, it is to be understood that a single application or more than two applications may be executed using embodiments of the present invention.

Coupled to each of applications 120 and 125 is a virtualized application environment 130 and 135, respectively. In various embodiments, virtualized application environments 130 and 135 may provide emulation of a runtime environment for which the application that it is supporting was written. For example, the runtime environment may be an operating system or a managed runtime environment (MRTE). In certain embodiments, one of the virtualized application environments may support multiple applications, but an application may run on a single virtualized application environment. Thus, applications 120 and 125 may be supported by the distributed environment 100 without modification. In other words, virtualized application environments 130 and 135 may be used to permit applications written for a single computer to be executed by a plurality of computers of a distributed environment infrastructure without modification.

In one embodiment, distributed environment infrastructure 100 may be a comprehensive middleware layer running on computers 110 which supports virtualized application environments 130 and 135 and resource allocators 140 and 145 (which will be discussed further below). In various embodiments, distributed environment infrastructure 100 may support a virtual machine (VM) environment and may map capacity requirements (e.g., computational load, storage access, and the like) of virtual machines and supported applications to available resources managed by the infrastructure environment.

Resource allocators 140 and 145 may be coupled between virtualized application environments 130 and 135 (respectively) and each of computers 110. These resource allocators may be used to map the virtual environment to computers 110 via services of distributed environment infrastructure 100. In one embodiment, resource allocators 140 and 145 may be utilities that map virtualized application environment activities to activities on computers 110 through distributed environment infrastructure 100.

Figure 2:
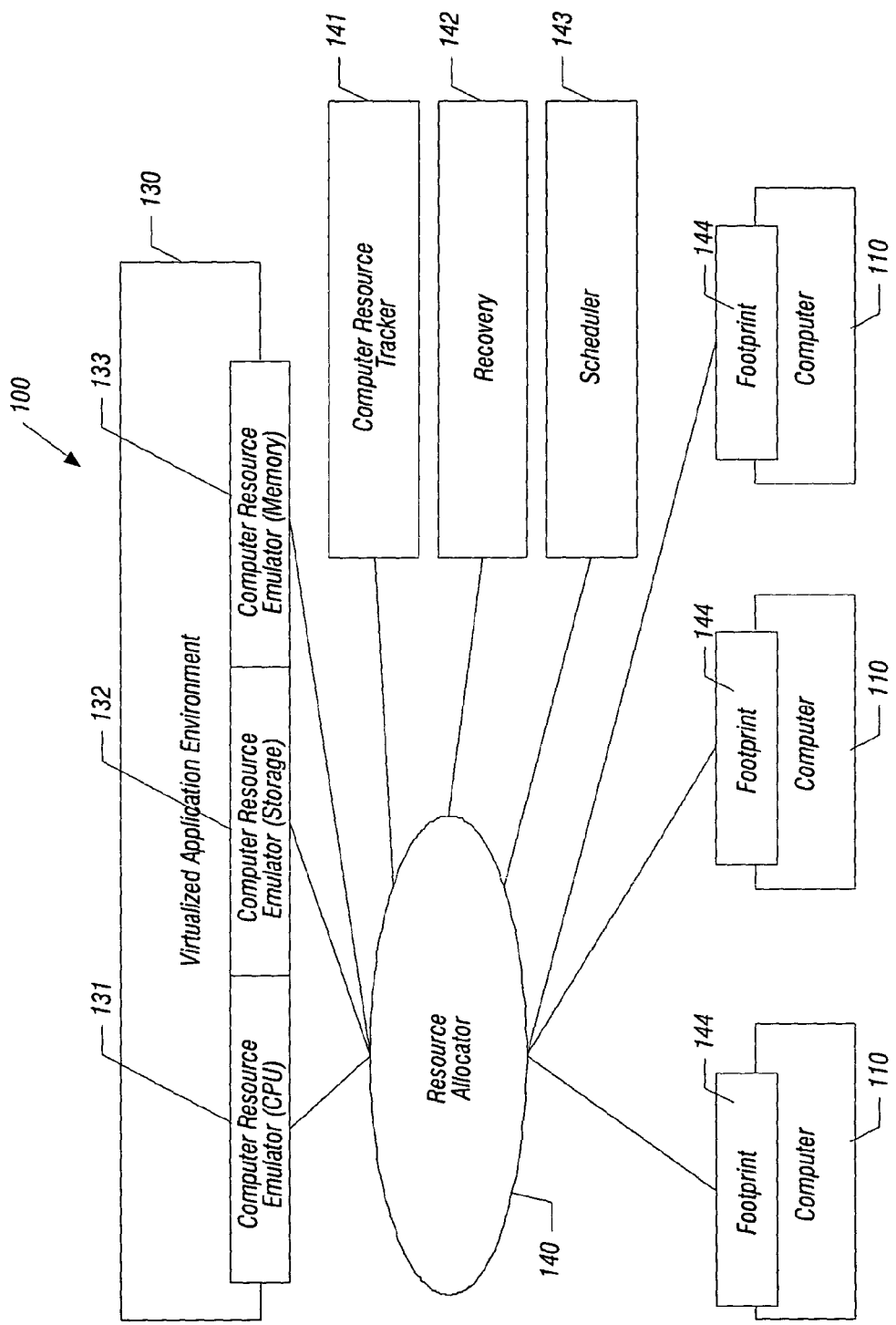
FIG. 2 is a block diagram of a resource allocator in accordance with one embodiment of the present invention.

Referring now to FIG. 2, shown is a block diagram of additional details of a resource allocator and its interaction within a distributed environment in accordance with one embodiment of the present invention. As shown in FIG. 2, resource allocator 140 may be coupled between virtualized application environment 130 and computers 110. Virtualized application environment 130 may include a plurality of computer resource emulators (e.g., emulators 131, 132 and 133). These emulators may appear to the application as operating system services that make computer resources available to the application. As shown in FIG. 2, such example emulators may include a central processing unit (CPU) emulator 131, a storage emulator 132 and a memory emulator 133. While shown in the embodiment of FIG. 2 as including three such resource emulators, in other embodiments more or different emulators may be provided.

Also shown in the embodiment of FIG. 2 are subsets of resource allocator 140, including computer resource tracker 141, recovery 142, scheduler 143 and footprints 144. In one embodiment, resource allocator 140 or resource tracker 141 may be responsible for keeping relevant state information for multiple threads in synchronicity, for example, via a transaction management model. Computer resource tracker 141, which may be a subset of resource allocator 140, may be used to track availability of computing resources, including detection of computers joining or being removed from the environment, and their available capacity. Recovery 142 may be a subset of resource allocator 140, and may be used to keep track of progress/state information and work subsets allocated to computers 110, such that work assigned to a given computer may be recovered and restarted in the event that the given computer is removed from the distributed environment infrastructure, either as a result of a failure or other such event.

In one embodiment, scheduler 143 may be a subset of resource allocator 140 and may be used to assign work tasks or subsets to computers 110. Finally, as shown in FIG. 2, footprints 144 may be a subset of resource allocator 140, and may reside on each computer 110. Footprints 144 may be used to conduct assigned work for the computer on which it resides. In one embodiment, each computer 110 may have only one footprint, and a footprint in a given environment may be shared by multiple resource allocators.

Figure 3:
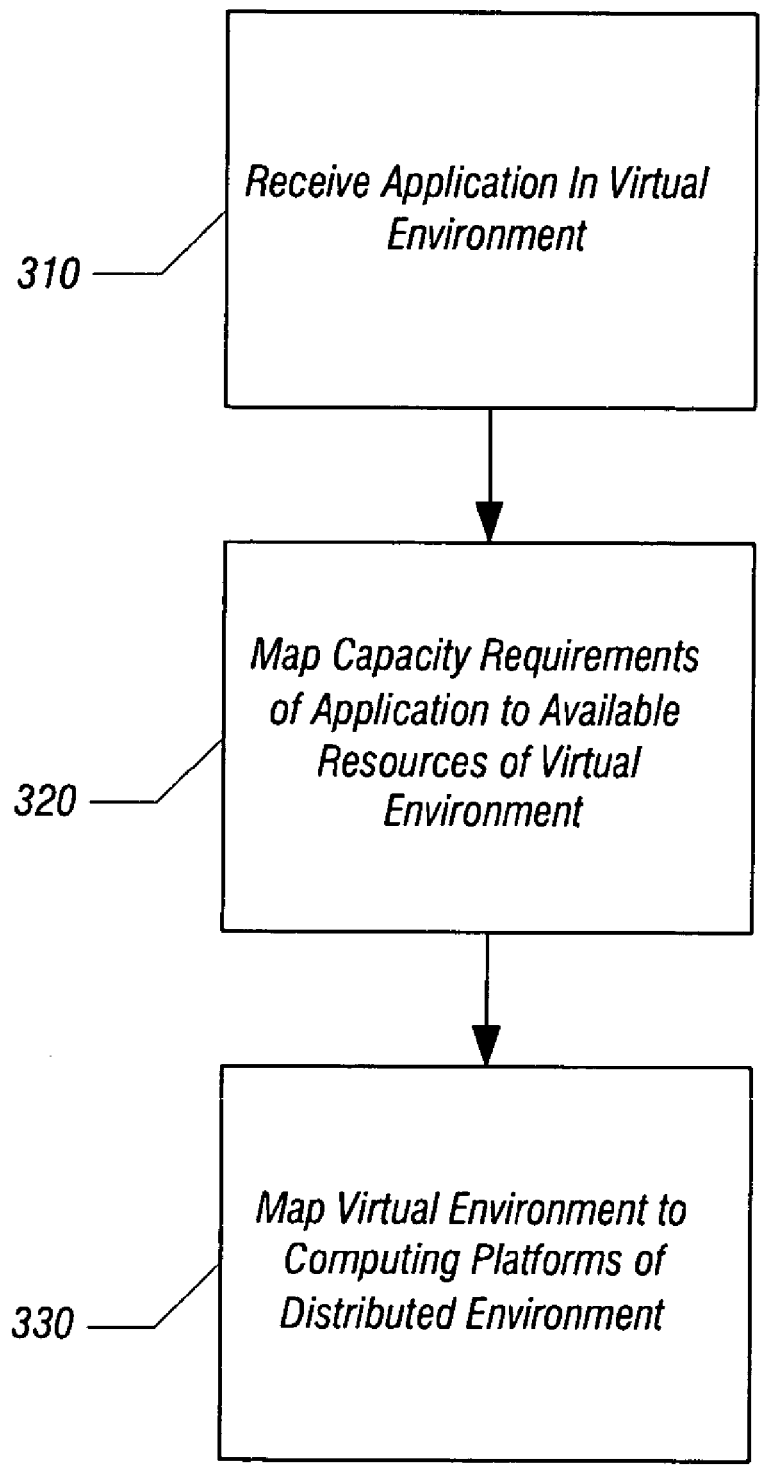
FIG. 3 is a flow diagram of a method in accordance with one embodiment of the present invention.

Referring now to FIG. 3, shown is a flow diagram of a method in accordance with one embodiment of the present invention. As shown in FIG. 3, the method begins by receiving an application in a virtual environment (block 310). In one embodiment, the virtual environment may include a set of operating system interface emulations, infrastructure objects representing resources of individual computers, infrastructure objects residing on the computers providing actual capacity resources, and resource allocation objects to monitor the resources available.

Next, the capacity requirements of the application may be mapped to available resources of the virtual environment (block 320). For example an application program having multiple threads may be segmented into different work subsets that may be mapped to available resources of the virtual environment. Then the virtual environment may be mapped to computing platforms available in the distributed environment (block 330).

For example, an enterprise having a number of servers coupled in a distributed environment (e.g., a tightly coupled environment) may desire to execute a COTS application written for a single computer on multiple computers in the environment. In such manner, higher availability and scalability may be realized. In accordance with the above method, an application written for a single computer may be executed by a plurality of computers available in the distributed environment without any modifications to the application.

Figure 4:
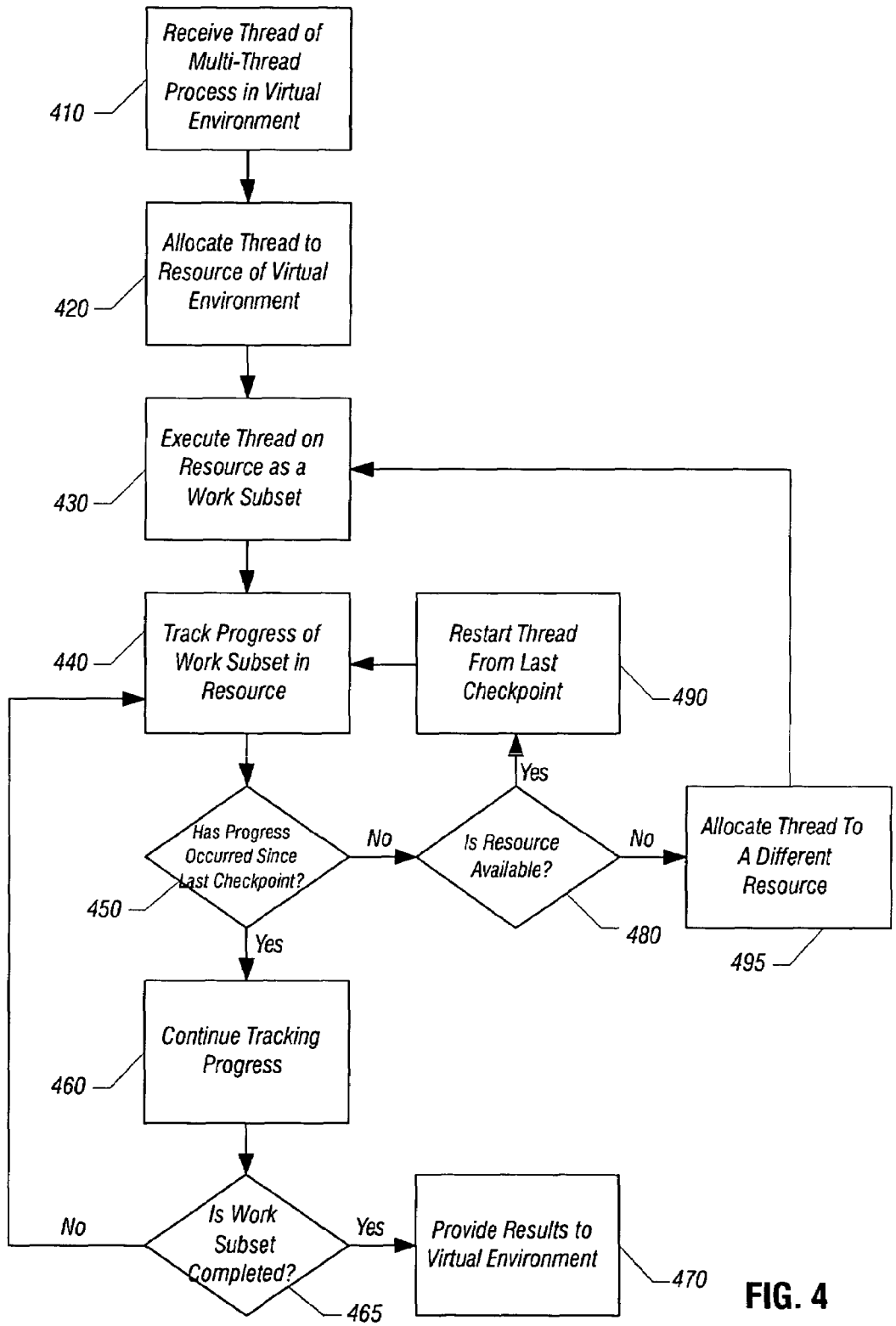
FIG. 4 is a flow diagram of a tracking method in accordance with one embodiment of the present invention.

Referring now to FIG. 4, shown is a flow diagram of a tracking method in accordance with one embodiment of the present invention. First, a thread of a multiple-threaded process may be received in a virtual environment (block 410). The threads may be associated with different contexts of an application, or may be different work subsets within an application. While discussed in the embodiment of FIG. 4 as a multiple-threaded application, in other embodiments a single threaded application may be similarly processed.

Next the thread may be allocated to a resource of the virtual environment (block 420). Different computers in the virtual environment may have one or more such resources associated therewith, for example, processing resources, storage resources, and other such resources. In one embodiment, a scheduler may be used to assign work subsets to different resources of the virtual environment.

The thread may then be executed on the resource as a work subset (block 430). In one embodiment, a subset of a resource allocator (e.g., a footprint) may reside on the resource to execute the work subset assigned to that resource.

While the work subset is being performed, progress of the work subset may be tracked (block 440). For example, in one embodiment, a resource tracker may track availability of the computing resources of the virtual environment. The resource tracker may also track the progress of the work subject by, for example, state information.

Next, it may be determined whether progress has occurred since the last checkpoint (decision block 450). If it is determined that no progress has occurred, it may be determined whether the resource remains available (decision block 480). If it is determined that the resource is available, the thread may be restarted from the last checkpoint (block 490) and control may return to block 440.

Alternately, if it is determined at decision block 480 that the resource is no longer available, the thread may be allocated to a different resource (block 495), and control may pass to block 430 for execution of the thread.

If at decision block 450 it is determined that progress has occurred since the last checkpoint, the progress of the work subset may continue to be tracked (block 460). In one embodiment, such tracking may include updating a checkpoint of the thread. In certain embodiments, the checkpointing process may be done on a resource other than the resource performing a given thread. In this manner, in case the resource fails or is no longer available to perform the thread, the checkpointing process may provide an indication that the thread should be provided to a different resource for execution.

It may then be determined whether the work subset has been completed (decision block 465). If the work subset has been completed, results may be provided to the virtual environment (block 470). In such manner, results from a given thread may be combined with results of other threads, and processing of the application may be continued as desired.

Alternately, if at decision block 465 it is determined that the work subset has yet to be completed, control may return to block 440 for further tracking of the progress of the work subset. While the flow diagram of FIG. 4 shows a method for tracking a single thread, it is to be understood that embodiments may be used to allocate work and track progress of multiple threads or other work subsets of an application.

In one example embodiment, an application desired to be executed on multiple computers in a tightly coupled distributed infrastructure may be an accounting application, such as a complicated spreadsheet. An example task to be performed by the application may be to update accounting tables for a number of clients. In such an embodiment, the application may be segmented such that a single processing thread is assigned to each client (e.g., client x, y and z). In such manner, the thread corresponding to each client may be sent to a different computer for processing. Then, the resulting updated tables may be provided back to the application for further desired processing.

In certain embodiments, state information relating to each thread of a multiple-threaded application may be segmented and provided to one of the computers along with the thread for processing. Such state information may include, in certain embodiments, an identification of the thread, memory locations, progress information, and the like. Alternately, in other embodiments such state information may be replicated and kept with each thread. Periodically, relevant state information must be synchronized between the various threads. In one embodiment, resource allocator 140 may be used to synchronize and track state information. Also, during operation, results of execution of code portions from different computers may be synchronized at predetermined time intervals. In one embodiment, resource allocator 140 or 145 may determine appropriate synchronization methods and intervals.

In one embodiment, a distributed environment may include middleware to separate tasks for execution by different computers. In one embodiment, a tightly coupled distributed network may be implemented using a Common Object Request Broker Architecture (CORBA), or another open distributed object computing infrastructure. In such embodiments, the middleware may act as a broker to track the segmentation and execution of an application among multiple computers.

In other embodiments, a loosely coupled distributed environment may be provided, for example, an environment implementing .NET architecture.

In various embodiments, middleware may perform an analysis of an application to determine a desired manner for segmenting the application among a plurality of computers. For example, in one embodiment a determination of localities of references in code may be performed to determine how frequently particular code portions refer to each other. In such manner, code portions that are dependent upon each other may be provided to the same computer for execution. In other embodiments, code portions that have dependencies on other code portions may be provided to the same computer for successive execution. Of course, in other embodiments, different manners of allocating code to different resources may be effected.

Embodiments may be implemented in a computer program that may be stored on a storage medium having instructions to program a distributed environment to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Thus, embodiments of the present invention may provide an emulation environment that supports an application, by mapping its activities to a set of resources, rather than a single resource. In such manner, a very high availability solution may be provided at an extremely low cost. Further, this near infinitely scalable solution may be incremented with low cost, incremental capacity (e.g., modular servers) that may be added and/or removed from the environment without interrupting service.

In certain embodiments, additional processing capacity may be added to the distributed environment, for example, using additional blade servers having one or more processors, such as the XEON™ or ITANTIUM™ processors, available from Intel Corporation, Santa Clara, Calif. In such manner, total cost of ownership (TCO) may be improved by accommodating additional levels of instructions consumed by the levels of software between application and computers in accordance with an embodiment of the present invention. Also, in certain embodiments, the objects residing on the computers providing actual capacity resources may be designed to take advantage of specific platform features.

Thus in certain embodiments, an emulated computational environment (e.g., operating system, managed run-time environment, or virtual machine) may be provided for a distributed infrastructure. Further, in certain embodiments, existing, commercially available tightly-coupled infrastructure products may serve as the infrastructure environment, thus reducing TCO for an enterprise.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computing system comprising:
   a plurality of systems coupled in a distributed infrastructure;
   a resource allocator to allocate activities of an application to at least two of the plurality of systems, wherein the resource allocator includes:
      a tracker to track availability of resources of the plurality of systems, to detect inclusion or exclusion of a system with regard to the plurality of systems, and to replicate and provide state information to each of a plurality of threads of the application in synchronicity and to synchronize the state information between the plurality of threads, via a transaction management model;
      a scheduler to assign work tasks or subsets to the plurality of systems; and
      a plurality of subsets of the resource allocator, each residing on a resource of one of the systems to conduct assigned work for the system on which it resides, wherein each of the plurality of systems includes a single one of the subsets configured to be shared by multiple resource allocators; and
   a virtualized application environment to emulate a runtime environment for the application, and to provide support of the application by the distributed infrastructure to enable the application to be executed in the plurality of systems without modification, wherein the application is written for a single system, the virtualized application environment including a plurality of resource emulators each to appear to the application as an operating system service to make a resource of the systems available to the application.

2. The computing system of claim 1, wherein the resource allocator is programmed to recover work from one of the systems if the system is removed from the virtualized application environment.

3. The computing system of claim 1, wherein the plurality of systems comprises server computers.

4. The computing system of claim 1, wherein the virtualized application environment comprises an emulated computational environment mapped to the distributed infrastructure.

5. The computing system of claim 1, wherein the distributed infrastructure is a tightly coupled distributed infrastructure.

6. The computing system of claim 1, wherein the resource allocator further includes a recovery to track progress information so that work assigned to a system can be recovered and restarted if the system is removed from the distributed infrastructure.

7. A method comprising:
allocating portions of an application program, based on a degree of operational dependence between the portions, to a plurality of computers in a distributed environment including a virtualized application environment to emulate a runtime environment for the application program and provide support of the application program by the distributed environment to enable the application program to be executed on the plurality of computers;
executing the portions on the plurality of computers, wherein the application program is written for a single processor and is to be executed on the plurality of computers without modification;
tracking progress of the portions via state information synchronized and maintained by a resource tracker via a transaction management model;
updating a checkpoint corresponding to at least one of the portions on a resource different than a first resource of one of the plurality of computers on which the portion is execution; and
allocating one of the portions to a different computer in the distributed environment if the checkpoint indicates no progress since a previous checkpoint.

8. The method of claim 7, further comprising emulating a computational environment mapped to the distributed environment.

9. The method of claim 7, further comprising, if the checkpoint indicates no progress, determining if the first resource is available and if so, restarting the portion from the previous checkpoint.

10. The method of claim 7, further comprising allocating at least two portions of the application program to a first computer based on a determination of localities of references in code of the two portions.

11. The method of claim 10, wherein the first portion and the second portion are dependent on each other.

12. An article comprising a machine-readable medium containing instructions that if executed enable a system to:
allocate portions of an application program, based on a degree of operational dependence between the portions, to a plurality of computers in a distributed environment including a virtualized application environment to emulate a runtime environment for the application program and provide support of the application program by the distributed environment to enable the application program to be executed on the plurality of computers;
executing the portions on the plurality of computers, wherein the application program is written for a single processor and is to be executed on the plurality of computers without modification:
track progress of the portions on the plurality of computers via state information synchronized and maintained by a resource tracker via a transaction management model;
recover one of the portions from one of the computers if the computer is removed from the distributed environment; and
allocate the recovered portion to a different computer in the distributed environment.

13. The article of claim 12, further comprising instructions that if executed enable the system to provide the state information to the plurality of computers with the portions, the state information including a thread identifier, memory location information, and progress information.

* * * * *